Jan. 28, 1969 F. R. FLUHR 3,424,987
CONTROLLED ANALOG DIFFERENTIAL-TAKING CIRCUIT
Filed May 20, 1965
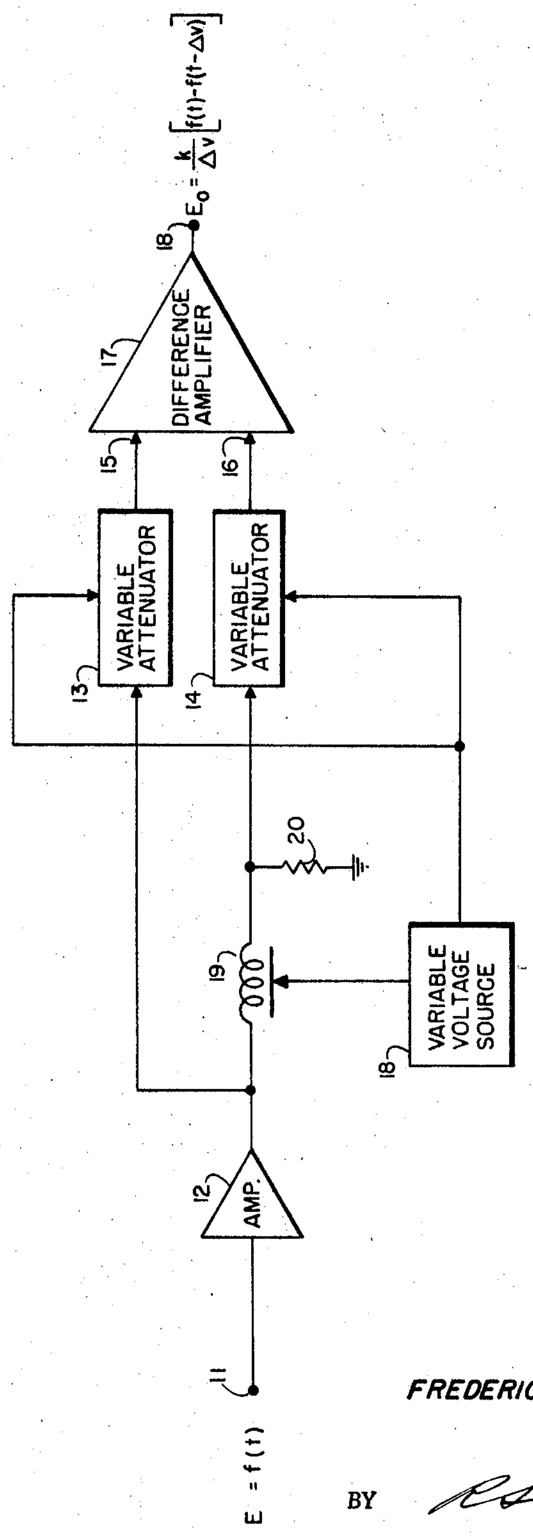
INVENTOR
FREDERICK R. FLUHR
BY
ATTORNEY United States Patent Office 3,424,987
Patented Jan. 28, 1969

3,424,987
CONTROLLED ANALOG DIFFERENTIAL-TAKING CIRCUIT

Frederick R. Fluhr, Washington, D.C., assignor to the United States of America as represented by the Secretary of the Navy Filed May 20, 1965, Ser. No. 457,532
U.S. Cl. 328—127 9 Claims
Int. Cl. G06g *7/18;* H03k *5/00*

ABSTRACT OF THE DISCLOSURE

An analog differential-taker for producing an approximate differential of the input function taken with respect to a given voltage in which the signal is directly attenuated in one variable attenuator and also attenuated in another variable attenuator after having been delayed by a voltage controlled delay line; the attenuated signals are then applied to a difference amplifier.

The invention described herein may be manufactured and used by or for the Government of the United States of America for governmental purposes without the payment of any royalties thereon or therefor.

The present invention relates to an electrical analog computation circuit and more particularly to an analog differential-taking circuit.

In the field of analog computation, differentiating circuits have been generally employed to produce an output signal which is proportional to the derivative of the input. Many of the circuits primarily employ an analog differentiator wherein the derivative obtained is taken strictly with respect to time. In certain analog applications, however, it has become necessary to employ a device which produces a differential which is a function of some other separately controllable parameter.

The general purpose of this invention is to provide an analog differential-taker wherein the signal produced is an approximate differential of the input function taken with respect to a given voltage. To attain this, the present invention contemplates a unique controlled analog differential-taker including a variable attenuator for attenuating a given signal and another variable attenuator for attenuating the same signal after having been delayed by a voltage controlled delay line. The signals are then applied to a difference amplifier which produces at its output an approximate differential of the input signal taken with respect to a voltage which controls the delay line and the attenuators.

An object of the present invention is the provision of a new and improved differential-taking circuit for producing a signal which is the differential of the input.

Another object is to provide a circuit for producing a controllable differential.

A further object of this invention is the provision of an analog circuit for obtaining the differential of a signal with respect to some separately controllable parameter.

Other objects and many of the attendant advantages of this invention will be readily appreciated as the same becomes better understood by reference to the following detailed description when considered in connection with the accompanying drawing wherein:

The figure shows a circuit diagram of the controlled analog differential-taking circuit of this invention.

Referring now to the drawing, there is shown the analog computation circuit of this invention including an input 11 for receiving a signal $E_1=f(t)$ connected to an amplifier 12 having its output coupled directly to conventional voltage controlled variable attenuator 13 and also through a voltage controlled delay line 19 to voltage controlled variable attenuator 14. Delay line 19 is controlled by a variable voltage source 18 and is shown with a terminating resistor 20 at its output. Delay line 19 may also be a current controlled delay line in which event source 18 will be a variable current source.

The signals applied to variable attenuators 13 and 14 are passed through their corresponding variable attenuator to inputs 15 and 16, respectively, of difference amplifier 17. Variable voltage source 18, which controls variable delay line 19, is also connected to control the variable attenuators 13 and 14.

When an input signal $f(t)$ is applied to input 11, it is amplified by amplifier 12 and applied through variable attenuator 13 to input 15 of difference amplifier 17. The same signal, $f(t)$, is also applied through controlled delay line 19 and through variable attenuator 14 to input 16 of difference amplifier 17. Delay line 19 produces a delay $\Delta T$ that is proportional to the applied voltage from variable voltage source 18 so that the signal applied to input 14 of variable attenuator 14 is $f(t-\Delta T)$. The signals $f(t)$ and $f(t-\Delta t)$ are attenuated separately by a factor $(N/\Delta v)$ where N is the gain of an attenuator and $\Delta v$ is the incremental voltage applied to the attenuator by source 18. The signals are then applied to inputs 15 and 16, respectively, of difference amplifier 17 so that the signal at output 18 is equal to the approximate differential, i.e., $$E_0=K[f(t)-f(t-\Delta T)] \quad (1)$$

If K is proportional to $k/\Delta T$ where $k$ is the gain, N, of one of the variable attenuators 13 and 14 together with the gain of differential amplifier 17, and $\Delta T$ is the incremental time delay produced by delay line 19, then $$E_0=\frac{k}{\Delta T}[f(t)-f(t-\Delta T)] \quad (2)$$

With $\Delta T$ proportional to $\Delta v$, then $$E_0=\frac{k}{\Delta v}[f(t)-f(t-\Delta v)] \quad (3)$$

where $\Delta v$ is an increment of voltage from source 18 which is applied to both the controllable delay line 19 and the variable attenuators 13 and 14. The output at 18 is therefore a differential of the input signal $f(t)$ with respect to the incremental control voltage.

It should be understood that within the scope of this invention the delay line and attenuator may be controlled by any device which produces a suitable control parameter to which the devices are responsive so that the differential is taken with respect to that particular control parameter.

It should also be understood that the attenuators 13 and 14 need not be employed to produce a differential output. Without the attenuators, the delay line 19 is the only controlled element of the circuit and the output signal is then $$E_0=K'[f(t)-f(t-\Delta v)] \quad (4)$$

where K′ is then the gain of the differential amplifier 17 only, and $\Delta v$ is proportional to $\Delta T$ which is the incremental delay of delay line 19.

An illustration of an additional use for the circuit of this invention without the attenuators involves two such circuits with one circuit receiving an input signal $f(t)$ and the other circuit receiving a signal $g(t)$. The circuits produce at their outputs the differentials $\Delta f$ and $\Delta g$, respectively, where $$\Delta f=K_1[f(t)-f(t-\Delta v_1)] \quad (5)$$

where $K_1$ is the gain of the differential amplifier in the first circuit and $v_1$ is proportional to the incremental delay of the controllable delay line of the first circuit, and $$\Delta g=K_2[g(t)-g(t-\Delta v_2)] \quad (6)$$

where $K_2$ is the gain of the differential amplifier in the second circuit and $\Delta v_2$ is proportional to the incremental delay of the controllable delay line of the first circuit. The outputs of each circuit $\Delta f$ and $\Delta g$ are then applied to a conventional analog divider which produces at its output a signal representing the quotient of the differentials, i.e., $\Delta f/\Delta g$.

Any controllable variable delay line may be used in the circuit of this invention. Where microminiaturization is a prime object, the variable delay line disclosed in my prior application Ser. No. 408,441, filed Nov. 2, 1964 for "Field Effect Delay Line" is suitable.

In summary, the present invention provides a circuit arrangement wherein an input signal is applied through a variable attenuator to one input of a difference amplifier and the delayed input signal is applied to another input through a second variable attenuator. The delay induced into said input signal is variable, separately controllable and proportional to the parameter produced by the controlling device. The output of the difference circuit is therefore proportional to the differential of the input signal with respect to the controlling parameter.

Obviously many modifications and variations of the present invention are possible in the light of the above teachings. It is therefore to be understood that within the scope of the appended claims the invention may be practiced otherwise than as specifically described.

What is claimed and desired to be secured by Letters Patent of the United States is:

1. A controlled analog differential-taking circuit comprising:

a first signal input for receiving a first signal, a difference circuit having a first input terminal and a second input terminal and an output terminal, a variable delay line connected between said first signal input and said second input terminal, means connecting said first signal input to said first input terminal, attenuating means connected between said first signal input and said output terminal, and means for controlling and varying the delay of said variable delay line together with said attenuating means.

2. A circuit for computing the differential of an input signal with respect to a variable voltage signal comprising:

a signal input for receiving said input signal, a difference circuit having a first input, a second input and an output, means connected to said signal input for applying said input signal to said first input of said difference circut, a delay line, whose delay is controllable by a voltage amplitude, coupled between said signal input and said second input of said difference circuit for delaying said input signal in proportion to the amplitude of a control voltage applied to said delay line, and means for applying said variable voltage signal as a control voltage to said delay line to vary the delay of said delay line in proportion to said variable voltage signal, whereby a signal produced at said output of said difference circuit is a differential of said input signal taken with respect to said variable voltage signal.

3. A circuit as set forth in claim 2 further including variable attenuating means connected between said signal input and said output and which is responsive to said variable voltage signal to vary the attenuation in proportion to said variable voltage signal.

4. A circuit as set forth in claim 2 wherein said difference circuit is a difference amplifier.

5. A circuit for computing the differential of a first variable input signal with respect to a second variable input signal comprising:

a first signal input for receiving said first input signal, a difference circuit having a first input, a second input and an output, means connected to said signal input for applying said first input signal to said first input of said difference circuit, a variable delay line comprising a first input terminal, an output terminal, and a continuous wave propagating means connected between said terminals, said delay line being connected between said first signal input and said second input of said difference circuit and being responsive to said second variable input signal to vary the amount of delay of said continuous wave propagating means, and means for applying said second variable input signal as a control signal to said delay line to vary the delay of said continuous wave propagating means in proportion to said second variable input signal, whereby a signal produced at said output of said difference circuit is a continuous differential of said first input signal taken continuously with respect to said second input signal.

6. A circuit as set forth in claim 5 further including variable attenuating means connected between said first signal input and said output and which is responsive to said second variable input signal to vary the attenuation in proportion to said second variable input signal.

7. A controlled analog differential-taking circuit comprising:

an input for receiving a signal, a difference circuit having a first and second input and an output, first controllable attenuating means coupled between said input and said first input of said difference circuit, a second controllable attenuating means coupled to said second input of said difference circuit, a variable delay line coupled between said input and said second controllable attenuating means, and means for controlling and varying said controllable delay line together with said first and second controllable attenuating means.

8. The circuit of claim 7 wherein the means for controlling comprises a variable voltage source, and wherein said delay line, first attenuating means and second attenuating means are voltage responsive and vary in proportion to the applied voltage from said variable voltage source.

9. The circuit of claim 7 wherein said difference circuit is a differential amplifier.

References Cited

UNITED STATES PATENTS

| | | | |
|---|---|---|---|
| 2,779,871 | 1/1957 | Patterson. | |
| 2,794,173 | 5/1957 | Ramey | 333—19 |
| 2,833,470 | 5/1958 | Welty. | |
| 3,003,696 | 10/1961 | Tullos et al. | |
| 3,141,969 | 7/1964 | Brendle. | |

ARTHUR GAUSS, *Primary Examiner.*

DONALD D. FORRER, *Assistant Examiner.*

U.S. Cl. X.R.

235—183; 307—229; 333—19